US009903731B2

(12) United States Patent
Fischer et al.

(10) Patent No.: US 9,903,731 B2
(45) Date of Patent: Feb. 27, 2018

(54) SYSTEM FOR DISPLAYING A THREE-DIMENSIONAL LANDMARK

(71) Applicant: Harman Becker Automotive Systems GmbH, Karlsbad (DE)

(72) Inventors: Martin Fischer, Munich (DE); Carsten-Christian Spindler, Karlsruhe (DE); Vladimir Ivanov, Munich (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 0 days.

(21) Appl. No.: 14/501,728

(22) Filed: Sep. 30, 2014

(65) Prior Publication Data
US 2015/0081204 A1 Mar. 19, 2015

Related U.S. Application Data

(62) Division of application No. 13/543,230, filed on Jul. 6, 2012.

(30) Foreign Application Priority Data

Jul. 6, 2011 (EP) .................................... 11172910
Jul. 26, 2011 (EP) .................................... 11175431

(51) Int. Cl.
*G01C 21/34* (2006.01)
*G01C 21/36* (2006.01)
(Continued)

(52) U.S. Cl.
CPC ............. *G01C 21/36* (2013.01); *G01C 21/32* (2013.01); *G01C 21/3476* (2013.01); *G01C 21/3638* (2013.01); *G06T 15/005* (2013.01)

(58) Field of Classification Search
None
See application file for complete search history.

(56) References Cited

U.S. PATENT DOCUMENTS 5,179,638 A   1/1993  Dawson et al.
6,169,516 B1  1/2001  Watanabe et al.
(Continued)

FOREIGN PATENT DOCUMENTS

EP   1650725 A1   4/2006
EP   1739643 A1   1/2007
(Continued)

OTHER PUBLICATIONS

Arne Schilling, et al., "Integrating Terrain Surface and Street Network for 3D Routing", 3D Geoinfo 08, 3rd International workshop on 3D geo-information, Nov. 2008 (Nov. 2008), XP002660659.
(Continued)

*Primary Examiner* — Navid Ziaeianmehdizadeh
(74) *Attorney, Agent, or Firm* — Artegis Law Group, LLP

(57) ABSTRACT

A system and method for processing a 3-dimensional landmark providing a 3-dimensional representation of a 3-dimensional real world object located at a predefined geographic location is provided. The method includes the steps of providing a data set containing the 3-dimensional landmark, determining a largest continuous horizontal surface of the 3-dimensional landmark, and storing the determined largest horizontal surface as road traffic area of a road network used by a user when moving on the object.

8 Claims, 7 Drawing Sheets

(51) Int. Cl.
*G06T 15/00* (2011.01)
*G01C 21/26* (2006.01)
*G01C 21/32* (2006.01)

(56) References Cited

U.S. PATENT DOCUMENTS

| | | | |
|---|---|---|---|
| 6,628,278 B1* | 9/2003 | Ritter | G01C 21/3638 |
| | | | 345/419 |
| 7,002,578 B1 | 2/2006 | Ritter | |
| 8,040,343 B2 | 10/2011 | Kikuchi et al. | |
| 8,099,233 B2 | 1/2012 | Matsuno et al. | |
| 8,626,440 B2 | 1/2014 | Cera et al. | |
| 2001/0008991 A1 | 7/2001 | Hamada et al. | |
| 2001/0019309 A1* | 9/2001 | Saeki | G01C 21/32 |
| | | | 340/995.1 |
| 2001/0037177 A1 | 11/2001 | Nishida et al. | |
| 2002/0076099 A1 | 6/2002 | Sakamoto et al. | |
| 2003/0154021 A1* | 8/2003 | Delling | G09B 29/007 |
| | | | 701/532 |
| 2004/0193369 A1 | 9/2004 | Kokojima et al. | |
| 2008/0228393 A1 | 9/2008 | Geelen et al. | |
| 2008/0249703 A1 | 10/2008 | Matsuno et al. | |
| 2009/0273601 A1 | 11/2009 | Kim | |
| 2011/0001751 A1 | 1/2011 | Carlsson et al. | |
| 2011/0033110 A1 | 2/2011 | Shimamura et al. | |
| 2011/0054778 A1 | 3/2011 | Poiesz et al. | |
| 2011/0109618 A1 | 5/2011 | Nowak et al. | |
| 2011/0140928 A1 | 6/2011 | Ren et al. | |
| 2011/0144909 A1 | 6/2011 | Ren et al. | |
| 2011/0153198 A1 | 6/2011 | Kokkas et al. | |
| 2011/0166783 A1 | 7/2011 | Ren et al. | |
| 2011/0288763 A1 | 11/2011 | Hui | |
| 2013/0179069 A1 | 7/2013 | Fischer et al. | |

FOREIGN PATENT DOCUMENTS

| | | |
|---|---|---|
| EP | 1752948 A1 | 2/2007 |
| EP | 1798704 A2 | 6/2007 |

OTHER PUBLICATIONS

European Patent Office, European Search Report for Application No. 11175431.3-1236, dated Oct. 24, 2011, pp. 1-11.

* cited by examiner

SYSTEM FOR DISPLAYING A THREE-DIMENSIONAL LANDMARK

PRIORITY CLAIM

This application is a divisional of co-pending U.S. patent application Ser. No. 13/543,230, filed Jul. 6, 2012, which claims the benefit of priority from European Patent Application EP 11 172 910.9 filed on Jul. 6, 2011 and European Patent Application 11 175 431.3 filed on Jul. 26, 2011. The above-mentioned applications are incorporated by reference in their entirety.

BACKGROUND OF THE INVENTION

Technical Field

The present invention relates to navigation systems and more specifically to systems for displaying a three dimensional landmark on a navigation system.

Related Art

Navigation systems provide driving recommendations to a user-defined destination. The navigation system, after having calculated the route to the desired destination, may display a two-dimensional bird's eye view map, the map indicating the road network in which the recommended route is somehow highlighted to the driver. This highlighting may be shown by displaying a line with a certain color in the road network.

Instead of displaying a two-dimensional map view, it is also possible that the navigation system displays 3-dimensional route guidance information which gives the driver a better impression of the vehicle surroundings. The database containing the map data can additionally contain 3-dimensional landmarks providing a 3-dimensional representation of a 3-dimensional real world object. An example for such a landmark is a 3-dimensional representation in the map data of famous monuments, such as the Golden Gate Bridge or the Tower Bridge. Another example could be a famous city gate.

These 3-dimensional landmarks are sometimes part of the road surface used by a vehicle for driving on or by a pedestrian for walking on. The data set providing the 3-dimensional landmark, however, does not contain information which part of the landmark is used for driving. As a consequence, it is not possible to include the 3-dimensional landmark into the display of 3-dimensional route guidance information when the landmark is part of the driving route.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

SUMMARY

Accordingly, a need exists to provide a possibility to include a 3-dimensional landmark into a display of a 3-dimensional route guidance recommendation. According to a first aspect, a method for processing a 3-dimensional landmark providing a 3-dimensional representation of a real world object located at a predefined geographic location is provided. A data set may be provided containing the 3-dimensional landmark and in the data set a largest continuous horizontal surface of the 3-dimensional landmark is determined and stored as a road traffic area of a road network used by a user when moving on the object. By determining the part of the 3-dimensional landmark which is used as a road traffic area for moving on the object and by storing this road traffic area as road traffic area, it is later on possible to incorporate the 3-dimensional landmark into a 3-dimensional route guidance information as part of the route. With the identification and storing of the road traffic area in the 3-dimensional landmark, the landmark can be used as part of the road network for routing.

The 3-dimensional landmark may be a famous bridge; however, it is also possible that the landmark is any other 3-dimensional object which is part of the road network, such as a city gate through which roads pass. The user may be a pedestrian or may be a vehicle driver driving in a vehicle.

The data set containing the 3-dimensional landmark can contain an array of vertices defining different faces of the real world object, the data set furthermore containing normal vectors for the different faces. The largest continuous horizontal surface can then be determined by comparing the normal vectors of the different faces and by identifying, among the normal vectors of the 3-dimensional landmark, first normal vectors that have a vertical orientation and that represent neighboring horizontal faces. When the horizontal faces belonging to the identified first normal vectors are identified, the largest horizontal surface of the 3-dimensional landmark is found. The orientation of the 3-dimensional landmark for displaying the 3-dimensional landmark is known so that the directions up, down, left and right for the landmark are known. The normal vectors may be identified that have a vertical upward orientation. With the upward orientation, it can be made sure that the determined largest continuous horizontal surface is facing upwards and not downwards towards the earth. Furthermore, it is possible that the data set of the landmark is processed from the top end to the bottom end to identify the largest continuous horizontal surface.

According to an example, a system may be configured to process the 3-dimensional landmark as mentioned above, the system may include a database containing at least a data set containing the 3-dimensional landmark and containing map data representing a road network used by a vehicle for driving or by the pedestrian for walking. Furthermore, an image data processing unit is provided processing the 3-dimensional landmark and configured to determine the largest continuous horizontal surface as mentioned above and configured to store in the database the determined largest horizontal surface as part of the road network. The system may be operative to implement a method for processing a 3-dimensional landmark according to any aspect or example.

According to another example, a method for displaying route guidance recommendations to a vehicle driver is provided. According to one step a driving route is determined, along which the user is moving. Furthermore, a road traffic area of the 3-dimensional landmark that is located along the route is determined and the road traffic area of the 3-dimensional landmark is marked with a predefined texture. Furthermore, 3-dimensional route guidance information is displayed including a 3-dimensional representation of at least a section of the route and including the 3-dimensional landmark with the marked road traffic area in the object. This displaying method uses the processed landmark that was processed as mentioned above to identify the road traffic area. With this method it becomes possible to include the landmark in the 3-dimensional representation of the route guidance or walking recommendation as part of the recommended route.

The route guidance information may include a displayed line which the vehicle driver or pedestrian should follow, the line including the marked road traffic area of the 3-dimensional landmark.

Furthermore, a navigation system is provided providing route guidance recommendations. The navigation system containing a navigation unit configured to determine a route, the navigation system further containing a database containing at least one data set containing the 3-dimensional landmark and containing map data representing a road network used by a vehicle for driving or by the pedestrian for walking. The navigation system furthermore contains an image viewer configured to display 3-dimensional route guidance information including a 3-dimensional representation of at least a section of the recommended route. The image viewer is configured to determine a road traffic area of the 3-dimensional landmark is configured to mark the road traffic area with a predefined texture and is configured to display the 3-dimensional route guidance information including the 3-dimensional landmark with the marked road traffic area. The image viewer can determine the road traffic area simply by retrieving the information of the road traffic area from the information stored in connection with the data set that is representing the 3-dimensional landmark.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

In the paragraphs that follow, examples of the invention will be described in connection with a vehicle user driving in a vehicle. However, it should be understood that the invention may also be applied to a pedestrian who is walking, or in other scenarios such as electronic city guides, route guidance for bicycles or other recreation activities, or similar.

Figure 1:
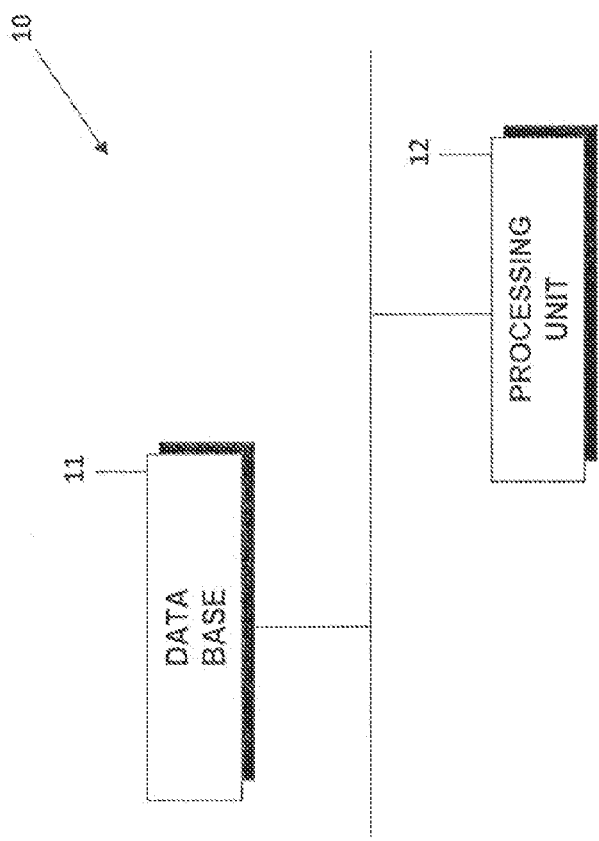
FIG. 1 shows a schematic view of a processing system with which a road traffic area of a 3-dimensional landmark can be identified.

FIG. 1 shows a processing system 10 with which it is possible to identify a road traffic area of a data set of a landmark providing a 3-dimensional representation of a real world object. This system 10 may contain a database 11 where data sets containing the 3-dimensional landmarks are stored. The landmark may be any one of a number of different landmarks, such as a 3-dimensional representation of the Tower Bridge in London or the Golden Gate Bridge in San Francisco or any other object that forms part of a road network used by vehicles for driving. The database 11 may furthermore contain map data with a road network. A processing unit 12 can process the 3-dimensional landmarks stored in the database 11 to identify the part of the 3-dimensional landmark that corresponds to the road surface.

Thus, the processing unit 12 is able to determine from the 3-dimensional representation of the landmark the part of the object that describes the road surface. The 3-dimensional landmark contained in database 11 may be provided as a triangulated geometry with an array of vertices, normal vectors, texture coordinates and triangle faces which are present as indices to the arrays. A data set containing a 3-dimensional landmark contains the information needed to display a 3-dimensional representation of the landmark. The processing unit 12 determines the faces of the data set which represent road surfaces. The processing unit 12 may compare the normal vectors of each face and searches for the largest continuous horizontal face. In this context, the processing unit 12 searches for the normal vectors having a vertical upward orientation which form a continuous horizontal surface. In one example, the data set is processed from the top end to the bottom end, meaning that, in the 3-dimensional representation, the faces of the object which are located at the upper end of the object are processed first. If the landmark is a bridge, this approach helps to correctly identify the upper surface.

Figure 6:
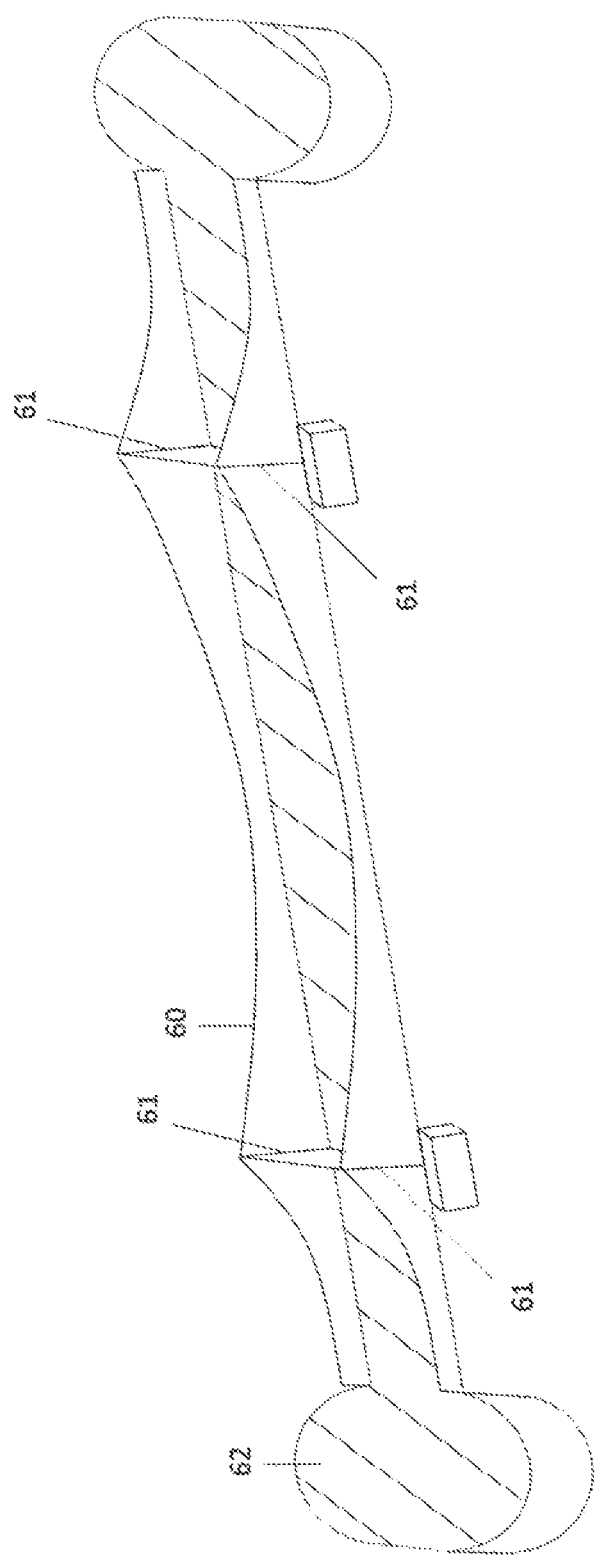
FIG. 6 shows an example of a 3-dimensional landmark for which the road traffic area has been identified.

Referring to FIG. 6, a 3-dimensional landmark 60 is shown, which shows the data set containing the data needed to display a 3-dimensional representation of the landmark. In the example shown in FIG. 6, the landmark has four upright columns 61. When the data set shown in FIG. 6 is processed as mentioned above by determining the largest continuous horizontal surface. The largest continuous horizontal surface (the hedged area) 62 is identified. This surface 62 represents the road traffic area used by the vehicle for driving.

Referring back to FIG. 1, when the processing unit 12 has identified the largest continuous horizontal surface of the 3-dimensional landmark, it stores the information of the surface as a road traffic area. The information is stored linked to the data set in such a way that a navigation system 20, such as the system as shown in FIG. 2, can use the identified information to provide a 3-dimensional representation of a driving recommendation.

Figure 2:
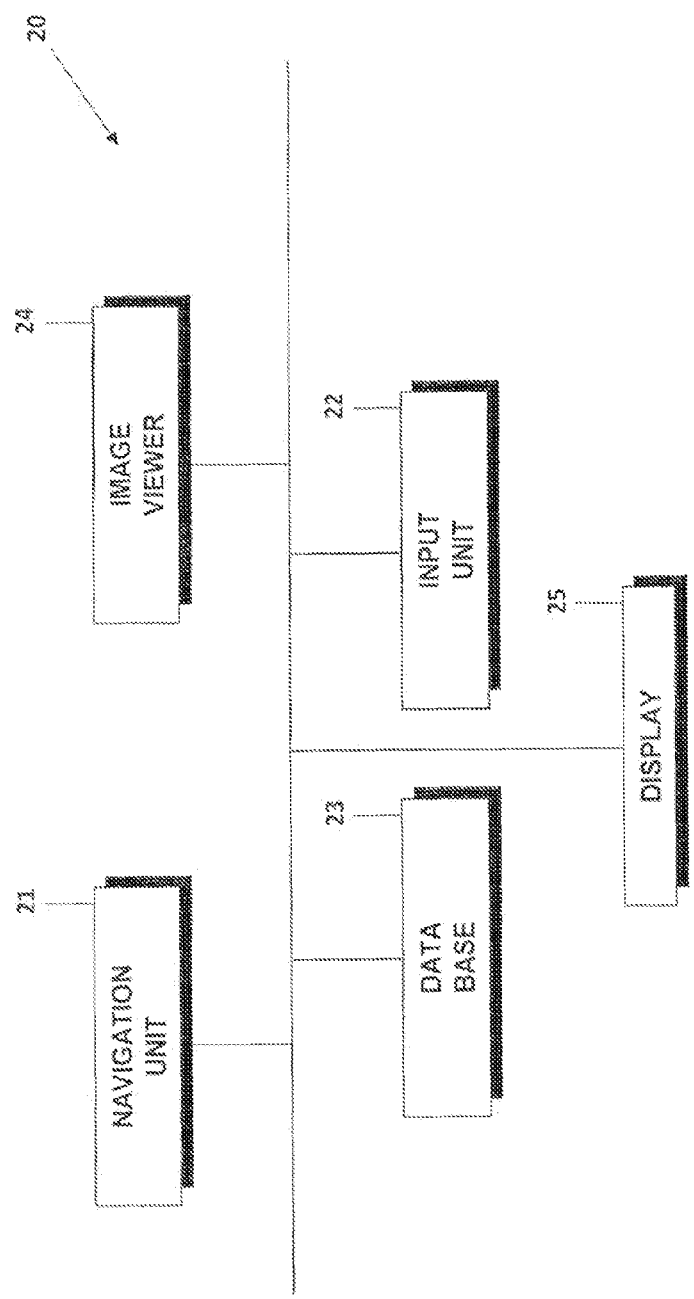
FIG. 2 schematically shows a navigation system that can use the information identified by the system of FIG. 1 to provide a 3-dimensional driving recommendation including the 3-dimensional landmark and its road traffic area.

The navigation system shown in FIG. 2 contains a navigation unit 21 which determines a route to a desired destination that may be input by a user of the navigation system 20 via an input unit 22. The way in which the navigation unit 21 calculates a route to a desired destination is known to the skilled person and will not be explained in further detail. The navigation system furthermore contains a database 23 in which the data sets containing the 3-dimensional landmarks are stored together with the information about the road traffic area as identified as discussed above in connection with FIG. 1. The database 23 furthermore contains the map data needed to calculate and display a route to a desired destination. An image viewer 24 generates displayed information to be displayed on a display 25. The image viewer may generate 3-dimensional route guidance 6 information where a section of the recommended route is shown in a 3-dimensional representation.

Figure 5:
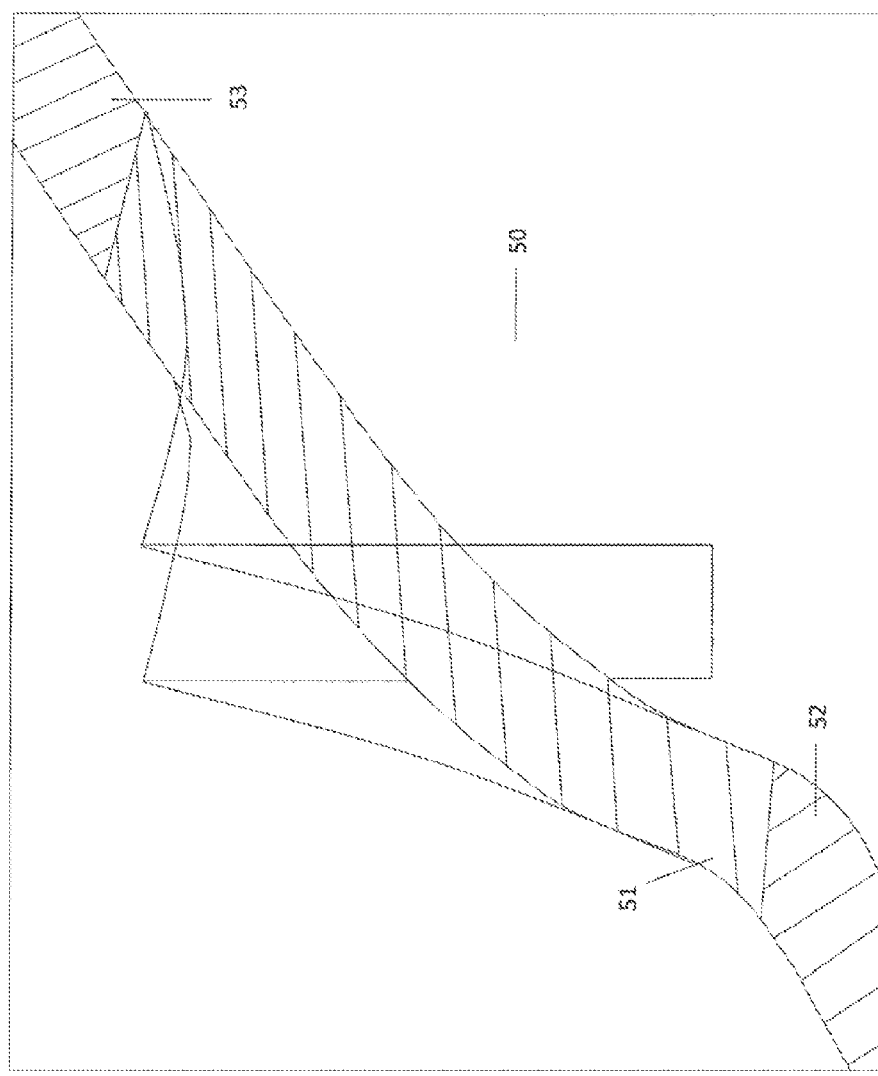
FIG. 5 shows an example of a 3-dimensional driving recommendation including the identified road traffic area of the landmark.

In FIG. 5, a part of a driving route is shown in a 3-dimensional representation. As shown in FIG. 5, the image viewer can retrieve, from the database and from a data set showing landmark 50, the road traffic area 51. The image viewer furthermore indicates a line 52 and 53, indicating the recommended route to the driver. As can be seen from FIG. 5, the identified road traffic area 51 can then be displayed as part of the line representing the route. The road traffic area can be displayed with a special road texture, the texture of the road traffic area 51 can be the same as the texture for the parts of the route 52 and 53, and however, it is also possible that a different texture is used for displaying the driving recommendation as shown in the example of FIG. 5.

It should be understood that the systems shown in FIG. 2 may contain additional components not shown. Furthermore, the components shown may be incorporated in fewer components or more components than shown in FIGS. 1 and 2. The components shown may be incorporated by software or by hardware or by a combination of software and hardware.

Figure 3:
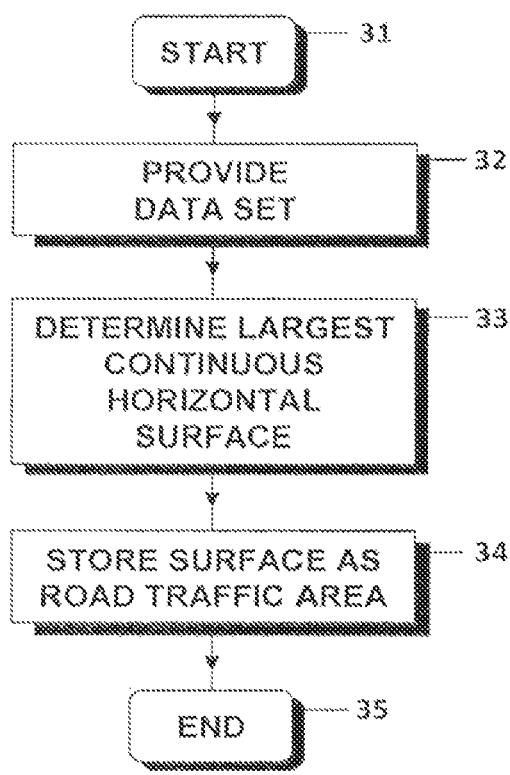
FIG. 3 shows a flowchart containing the steps for processing the 3-dimensional landmark.

In FIG. 3, an example method to process the 3-dimensional landmark to identify the road traffic area of the landmark is shown. The method starts in step 31. In step 32, the data set is provided to the processing unit. In step 33, the largest horizontal continuous surface is determined. One possibility to determine the horizontal surface was described above by identifying the normal vectors having a vertical upright orientation and by identifying the corresponding faces which build a continuous horizontal surface. However, it should be understood that any other method might be used to identify in the data set of the 3-dimensional landmark the largest continuous horizontal surface. When the surface has been identified, this surface is stored in step 34 as the road traffic area used by a vehicle for driving. This information may be stored as an attribute of the data set of the 3-dimensional landmark. The method ends in step 35.

Figure 4:
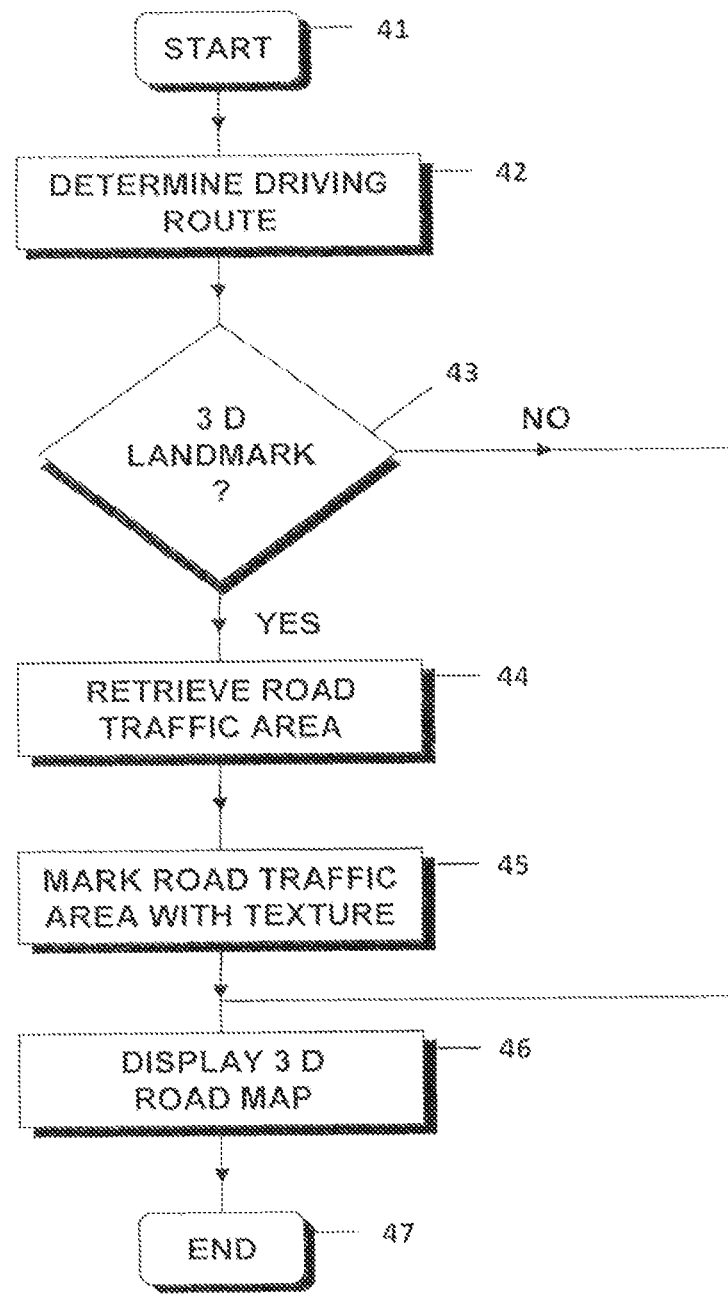
FIG. 4 shows a flowchart containing the steps for providing 3-dimensional driving recommendations including the landmark.

In FIG. 4, the steps are shown of an example of how the information obtained with the processing of FIG. 3 can be used by the navigation system 20 as shown in FIG. 2. The method starts in step 41. In step 42, the driving route is determined The determined driving route can either be a driving route calculated to a desired destination, however, it is also possible that the driver did not input a desired destination but simply that used the navigation system to display the currently used route, such as to warn the driver of traffic congestions displayed on the display together with the current position of the vehicle. In step 43, it is determined whether a 3-dimensional landmark that is part of the driving route is located on the current driving route. If this is the case, the road traffic area stored in connection with the data set as explained above is retrieved in step 44 and the road traffic area is marked with a predefined texture in step 45. In step 46, the 3-dimensional driving recommendation is displayed as a 3-dimensional road map. If the 3-dimensional landmark is located on the route, the 3-dimensional landmark is displayed together with the road traffic area as shown in FIG. 5. If it is determined in step 43 that no landmark is located along the route, the 3-dimensional driving recommendation is displayed by simply displaying a 3-dimensional view of the road map. The method ends in step 47.

Figure 7:
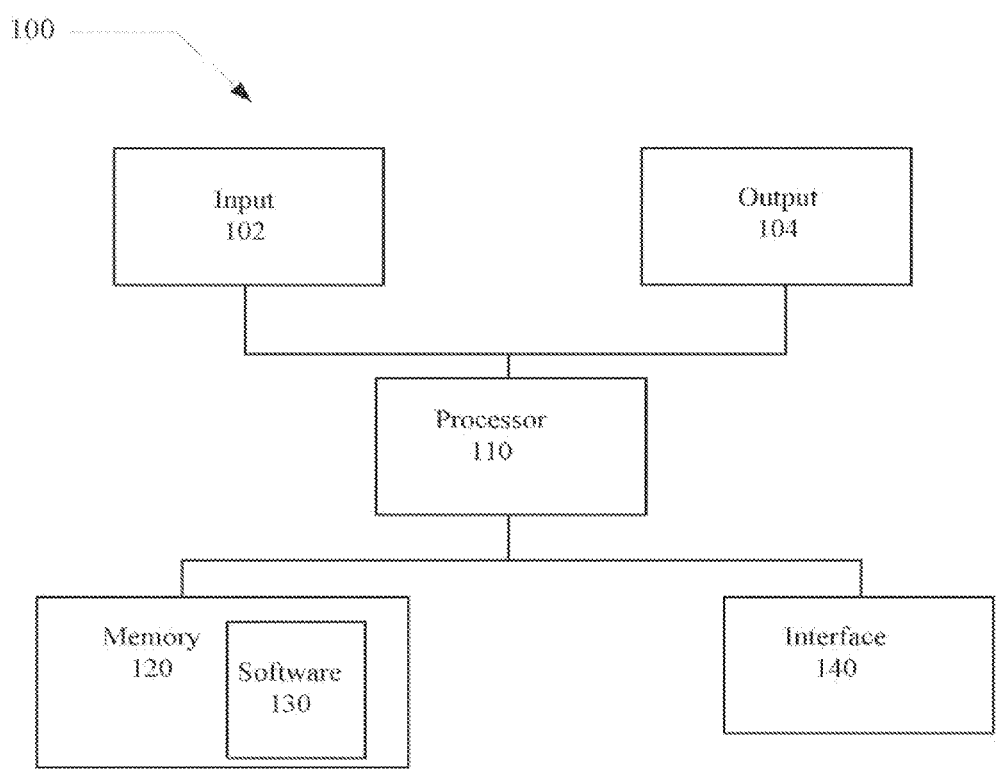
FIG. 7 is an example schematic of a vehicle navigation system.

FIG. 7 is an example of a navigation system 100. In addition to one or more inputs 102 and one or more outputs 104, the navigation system 100 may include a processor 110, a memory 120, software 130, and an interface 140. The navigation system 100 may include analog signal processing and digital signal processing capability.

The processor 110 may include one or more devices capable of executing instructions to perform one or more operations within the navigation system 100. In FIG. 7, the processor 110 is incorporated into the navigation system 100. The processor 110 may be one or more general processors, digital signal processors (DSP), application specific integrated circuits (ASIC), field programmable gate arrays (FPGA), server computers, networks, digital circuits, analog circuits, combinations thereof, or other now known or later developed devices for analyzing and processing digital and analogue data. The processor 110 may operate in conjunction with a software program, such as instructions or code and data stored in the navigation system 100.

The processor 110 may be coupled with memory 120, or memory 120 may be a separate component. Software 130 may be stored in memory 120. Memory 120 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 120 may include a random access memory for 8 the processor. Alternatively, the memory 120 may be separate from the processor, such as a cache memory of a processor, the system memory, or other memory. The memory may be an external storage device or database for storing recorded data. Examples include a hard drive, compact disc ("CD"), digital video disc ("DVD"), memory card, memory stick, floppy disc, universal serial bus ("USB") memory device, or any other device operative to store data. The memory 120 may be operable to store instructions executable by the processor.

The navigation system 100 may have an interface 140. The interface 140 may include knobs, switches, sliding components, buttons, a mouse, keyboard, a display, a touch screen or other devices or mechanisms capable of receiving user inputs for adjusting, modifying or controlling one or more features of the navigation system 100 and providing outputs sensed by a user. The interface 140 may be used to manipulate one or more characteristics, components, or features of the navigation system 100. For example, the navigation system 100 may include a slider which, when moved, modifies the volume for one or more of the received signals processed by the console. In another example, the interface 140 may include a knob, that when turned, modifies the gain applied by one or more amplifiers in the navigation system 100. In still another example, the navigation system 100 may be a data input location displayed in a display and a corresponding data input device in which parameters, such as a gain, a threshold, or any other parameter may be entered by a user of the navigation system 100.

The functions, acts, tasks, methods, and/or components described herein may be performed or represented by a programmed processor executing instructions stored in memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. A processor may be configured to execute the software.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for displaying route guidance recommendations to a user of a navigation system, the method comprising the steps of:
   determining, by a processor, a route along which the user is moving;
   receiving, from a database, at least one landmark data set stored in the database separately from all other data sets in the database, wherein each of the at least one landmark data set stores graphical information representing only one or more 3-dimensional landmarks that include a road traffic area, providing a 3-dimensional representation of one or more real world objects located at predefined geographic locations, wherein the graphical information stored in the at least one landmark data set includes an attribute representing the road traffic area of the one or more 3-dimensional landmarks;
   determining, by the processor, which portion of the graphical information stored in the at least one landmark data set represents the road traffic area of at least one 3-dimensional landmark that is included in the one or more 3-dimensional landmarks and is located along the route based on the attribute of the corresponding landmark data set;
   marking, by the processor, the road traffic area of the at least one 3-dimensional landmark with a predefined texture; and
   displaying a 3-dimensional route guidance information including a 3-dimensional representation of at least a section of the route and including the at least one 3-dimensional landmark with the marked road traffic area.

2. The method for displaying route guidance recommendations to a user of a navigation system according to claim 1, wherein the 3-dimensional route guidance information includes a displayed line which the user should follow, the line including the marked road traffic area of the at least one 3-dimensional landmark.

3. The method for displaying route guidance recommendations to a user of a navigation system according to claim 1, wherein the route guidance recommendations are displayed to a vehicle driver, the navigation system determining a driving route.

4. The method for displaying route guidance recommendations to a user of a navigation system according to claim 1, wherein at least one of the real world objects is a bridge.

5. A navigation system providing route guidance recommendations to a user, the system comprising:
   a navigation unit configured to determine a route, along which the user is moving;
   a database containing at least one landmark data set stored in the database separately from all other data sets in the database, wherein each of the at least one data set stores graphical information representing only one or more 3-dimensional landmarks that include a road traffic area, providing a 3-dimensional representation of one or more real world objects located at predefined geographic locations, wherein the database further contains map data representing a road network, wherein the graphical information stored in the at least one landmark data set includes an attribute representing the road traffic area of the one or more 3-dimensional landmarks; and
   an image viewer configured to display in a display 3-dimensional route guidance information including a 3-dimensional representation of at least a section of the route, wherein the image viewer is configured to determine which portion of the graphical information stored in the at least one landmark data set represents the road traffic area of at least one 3-dimensional landmark that is included in the one or more 3-dimensional landmarks and is located along the route based on the attribute of the corresponding landmark data set, is configured to mark the road traffic area of the at least one 3-dimensional landmark with a predefined texture, and is configured to display the 3-dimensional route guidance information including the at least one 3-dimensional landmark with the marked road traffic area.

6. The navigation system providing route guidance recommendations according to claim 5, wherein the image viewer is configured to determine the road traffic area of the at least one 3-dimensional landmark by retrieval of the road traffic area stored in connection with the data set containing the at least one 3-dimensional landmark from the data set.

7. The navigation system providing route guidance recommendations according to claim 5, wherein the navigation unit is configured to determine a driving route for a vehicle.

8. The navigation system providing route guidance recommendations according to claim 5, wherein at least one of the real world objects is a bridge.

* * * * *